United States Patent
Adams et al.

(10) Patent No.: US 11,151,154 B2
(45) Date of Patent: *Oct. 19, 2021

(54) GENERATION OF SYNTHETIC CONTEXT OBJECTS USING BOUNDED CONTEXT OBJECTS

(71) Applicant: International Business Machines Corporation, Armonk, NY (US)

(72) Inventors: Samuel S. Adams, Rutherfordton, NC (US); Robert R. Friedlander, Southbury, CT (US); John K. Gerken, III, Apex, NC (US); James R. Kraemer, Santa Fe, NM (US); Philip R. Varker, Tuckahoe, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/055,267

(22) Filed: Aug. 6, 2018

(65) Prior Publication Data

US 2018/0373768 A1 Dec. 27, 2018

Related U.S. Application Data

(63) Continuation of application No. 13/861,058, filed on Apr. 11, 2013, now Pat. No. 10,152,526.

(51) Int. Cl.
*G06F 16/26* (2019.01)
*G06F 16/78* (2019.01)

(52) U.S. Cl.
CPC .............. *G06F 16/26* (2019.01); *G06F 16/78* (2019.01)

(58) Field of Classification Search
None
See application file for complete search history.

(56) References Cited

U.S. PATENT DOCUMENTS 5,450,535 A 9/1995 North
5,664,179 A 9/1997 Tucker
(Continued)

FOREIGN PATENT DOCUMENTS

CN 101866342 A 10/2010
CN 102201043 9/2011
(Continued)

OTHER PUBLICATIONS

Faulkner, Paul, "Common Patterns for Synthetic Events in Websphere Business Events," Jan. 15, 2011, http://www.ibm.com/developerworks/websphere/bpmjournal/1101_faulkner2/1101_faulkner2.html, pp. 1-6.
(Continued)

*Primary Examiner* — Thu N Nguyen
(74) *Attorney, Agent, or Firm* — Law Office of Jim Boice

(57) ABSTRACT

A computer-implemented method, system, and/or computer program product generates and utilizes synthetic context-based objects. One or more processors define a context object, where the context object provides a context that identifies a specific subject-matter, from multiple subject-matters, of a non-contextual data object. The processor(s) associate the non-contextual data object with the context object to define a synthetic context-based object and the synthetic context-based object with at least one specific data store. A request is received from a requester for data from said at least one specific data store that is associated with the synthetic context-based object, where said at least one specific data store is within a database of multiple data stores. Data is returned to the requester from said at least one specific data store that is associated with the synthetic context-based object.

20 Claims, 9 Drawing Sheets

(56) References Cited

U.S. PATENT DOCUMENTS

| | | |
|---|---|---|
| 5,689,620 A | 11/1997 | Kopec et al. |
| 5,701,460 A | 12/1997 | Kaplan et al. |
| 5,943,663 A | 8/1999 | Mouradian |
| 5,974,427 A | 10/1999 | Reiter |
| 6,167,405 A | 12/2000 | Rosensteel |
| 6,199,064 B1 | 3/2001 | Schindler |
| 6,269,365 B1 | 7/2001 | Kiyoki et al. |
| 6,275,833 B1 | 8/2001 | Nakamura et al. |
| 6,314,555 B1 | 11/2001 | Ndumu et al. |
| 6,334,156 B1 | 12/2001 | Matsuoka et al. |
| 6,353,818 B1 | 3/2002 | Carino, Jr. |
| 6,381,611 B1 | 4/2002 | Roberge et al. |
| 6,405,162 B1 | 6/2002 | Segond et al. |
| 6,424,969 B1 | 7/2002 | Gruenwald |
| 6,553,371 B2 | 4/2003 | Gutierrez-Rivas et al. |
| 6,633,868 B1 | 10/2003 | Min et al. |
| 6,735,593 B1 | 5/2004 | Williams |
| 6,768,986 B2 | 7/2004 | Cras et al. |
| 6,925,470 B1 | 8/2005 | Sangudi et al. |
| 6,990,480 B1 | 1/2006 | Burt |
| 7,019,740 B2 | 3/2006 | Georgalas |
| 7,047,253 B1 | 5/2006 | Murthy et al. |
| 7,058,628 B1 | 6/2006 | Page |
| 7,103,836 B1 | 9/2006 | Nakamura et al. |
| 7,152,070 B1 | 12/2006 | Musick et al. |
| 7,191,183 B1 | 3/2007 | Goldstein |
| 7,209,923 B1 | 4/2007 | Cooper |
| 7,337,174 B1 | 2/2008 | Craig |
| 7,441,264 B2 | 10/2008 | Himmel et al. |
| 7,477,165 B2 | 1/2009 | Fux |
| 7,493,253 B1 | 2/2009 | Ceusters et al. |
| 7,503,007 B2 | 3/2009 | Goodman et al. |
| 7,523,118 B2 | 4/2009 | Friedlander et al. |
| 7,523,123 B2 | 4/2009 | Yang et al. |
| 7,571,163 B2 | 8/2009 | Trask |
| 7,679,534 B2 | 3/2010 | Kay et al. |
| 7,702,605 B2 | 4/2010 | Friedlander et al. |
| 7,748,036 B2 | 6/2010 | Speirs, III et al. |
| 7,752,154 B2 | 7/2010 | Friedlander et al. |
| 7,797,319 B2 | 7/2010 | Piedmonte |
| 7,778,955 B2 | 8/2010 | Kuji |
| 7,783,586 B2 | 8/2010 | Friedlander et al. |
| 7,788,202 B2 | 8/2010 | Friedlander et al. |
| 7,788,203 B2 | 8/2010 | Friedlander et al. |
| 7,792,774 B2 | 9/2010 | Friedlander et al. |
| 7,792,776 B2 | 9/2010 | Friedlander et al. |
| 7,792,783 B2 | 9/2010 | Friedlander et al. |
| 7,805,390 B2 | 9/2010 | Friedlander et al. |
| 7,805,391 B2 | 9/2010 | Friedlander et al. |
| 7,809,660 B2 | 10/2010 | Friedlander et al. |
| 7,853,611 B2 | 12/2010 | Friedlander et al. |
| 7,870,113 B2 | 1/2011 | Gruenwald |
| 7,877,682 B2 | 1/2011 | Aegerter |
| 7,925,610 B2 | 4/2011 | Elbaz et al. |
| 7,930,262 B2 | 4/2011 | Friedlander et al. |
| 7,940,959 B2 | 5/2011 | Rubenstein |
| 7,953,686 B2 | 5/2011 | Friedlander et al. |
| 7,970,759 B2 | 6/2011 | Friedlander et al. |
| 7,996,373 B2 | 8/2011 | Zoppas et al. |
| 7,996,393 B1 | 8/2011 | Nanno et al. |
| 8,032,508 B2 | 10/2011 | Martinez et al. |
| 8,046,358 B2 | 10/2011 | Thattil |
| 8,055,603 B2 | 11/2011 | Angell et al. |
| 8,069,188 B2 | 11/2011 | Larson et al. |
| 8,086,614 B2 | 12/2011 | Novy |
| 8,095,726 B1 | 1/2012 | O'Connell et al. |
| 8,145,582 B2 | 3/2012 | Angell et al. |
| 8,150,882 B2 | 4/2012 | Meek et al. |
| 8,155,382 B2 | 4/2012 | Rubenstein |
| 8,161,048 B2 | 4/2012 | Procopiuc et al. |
| 8,199,982 B2 | 6/2012 | Fueyo et al. |
| 8,234,285 B1 | 7/2012 | Cohen |
| 8,250,581 B1 | 8/2012 | Blanding et al. |
| 8,341,626 B1 | 12/2012 | Gardner et al. |
| 8,447,273 B1 | 5/2013 | Friedlander et al. |
| 8,457,355 B2 | 6/2013 | Brown et al. |
| 8,489,641 B1 | 7/2013 | Seefeld et al. |
| 8,620,958 B1 | 12/2013 | Adams et al. |
| 8,799,323 B2 | 8/2014 | Nevin, III |
| 8,849,907 B1 | 9/2014 | Hession et al. |
| 8,983,981 B2 | 3/2015 | Adams et al. |
| 2001/0051881 A1 | 12/2001 | Filler |
| 2002/0091677 A1 | 7/2002 | Sridhar |
| 2002/0111792 A1 | 8/2002 | Cherny |
| 2002/0184401 A1 | 12/2002 | Kadel et al. |
| 2003/0065626 A1 | 4/2003 | Allen |
| 2003/0088576 A1 | 5/2003 | Hattori et al. |
| 2003/0149562 A1 | 8/2003 | Walther |
| 2003/0149934 A1 | 8/2003 | Worden |
| 2003/0212664 A1 | 11/2003 | Breining et al. |
| 2003/0212851 A1 | 11/2003 | Drescher et al. |
| 2004/0036716 A1 | 2/2004 | Jordahl |
| 2004/0111410 A1 | 6/2004 | Burgoon et al. |
| 2004/0153461 A1 | 8/2004 | Brown et al. |
| 2004/0162838 A1 | 8/2004 | Murayama et al. |
| 2004/0249789 A1 | 12/2004 | Kapoor et al. |
| 2005/0050030 A1 | 3/2005 | Gudbjartsson et al. |
| 2005/0165866 A1 | 7/2005 | Bohannon et al. |
| 2005/0181350 A1 | 8/2005 | Benja-Athon |
| 2005/0188088 A1 | 8/2005 | Fellenstein et al. |
| 2005/0222890 A1 | 10/2005 | Cheng et al. |
| 2005/0273730 A1 | 12/2005 | Card et al. |
| 2005/0283679 A1 | 12/2005 | Heller et al. |
| 2006/0004851 A1 | 1/2006 | Gold et al. |
| 2006/0036568 A1 | 2/2006 | Moore et al. |
| 2006/0190195 A1 | 8/2006 | Watanabe et al. |
| 2006/0197762 A1 | 9/2006 | Smith et al. |
| 2006/0200253 A1 | 9/2006 | Hoffberg et al. |
| 2006/0256010 A1 | 11/2006 | Tanygin et al. |
| 2006/0271586 A1 | 11/2006 | Federighi et al. |
| 2006/0290697 A1 | 12/2006 | Madden et al. |
| 2007/0006321 A1 | 1/2007 | Bantz et al. |
| 2007/0016614 A1 | 1/2007 | Novy |
| 2007/0038651 A1 | 2/2007 | Bernstein et al. |
| 2007/0067343 A1 | 3/2007 | Mihaila et al. |
| 2007/0073734 A1 | 3/2007 | Doan et al. |
| 2007/0079356 A1 | 4/2007 | Grinstein |
| 2007/0088663 A1 | 4/2007 | Donahue |
| 2007/0130182 A1 | 6/2007 | Forney |
| 2007/0136048 A1 | 6/2007 | Richardson-Bunbury et al. |
| 2007/0174840 A1 | 6/2007 | Sharma |
| 2007/0185850 A1 | 8/2007 | Walters et al. |
| 2007/0239710 A1 | 10/2007 | Jing et al. |
| 2007/0250650 A1* | 10/2007 | Fux .................. G06F 3/02 710/67 |
| 2007/0282916 A1 | 12/2007 | Albahari et al. |
| 2007/0300077 A1 | 12/2007 | Mani et al. |
| 2008/0065655 A1 | 3/2008 | Chakravarthy et al. |
| 2008/0066175 A1 | 3/2008 | Dillaway et al. |
| 2008/0086442 A1 | 4/2008 | Dasdan et al. |
| 2008/0091503 A1 | 4/2008 | Schirmer et al. |
| 2008/0133474 A1 | 6/2008 | Hsiao et al. |
| 2008/0147780 A1 | 6/2008 | Trevor et al. |
| 2008/0159317 A1 | 7/2008 | Iselbom et al. |
| 2008/0172715 A1 | 7/2008 | Geiger et al. |
| 2008/0208813 A1 | 8/2008 | Friedlander et al. |
| 2008/0208838 A1 | 8/2008 | Friedlander et al. |
| 2008/0208901 A1 | 8/2008 | Friedlander et al. |
| 2008/0281801 A1* | 11/2008 | Larson .................. G06F 16/748 |
| 2008/0306926 A1 | 12/2008 | Friedlander et al. |
| 2009/0024553 A1 | 1/2009 | Angell et al. |
| 2009/0064300 A1 | 3/2009 | Bagepalli et al. |
| 2009/0080408 A1 | 3/2009 | Natoli et al. |
| 2009/0125546 A1 | 5/2009 | Iborra et al. |
| 2009/0144609 A1 | 6/2009 | Liang et al. |
| 2009/0164649 A1 | 6/2009 | Kawato |
| 2009/0165110 A1 | 6/2009 | Becker et al. |
| 2009/0177484 A1 | 7/2009 | Davis et al. |
| 2009/0182707 A1 | 7/2009 | Kinyon et al. |
| 2009/0287676 A1 | 11/2009 | Dasdan |
| 2009/0299988 A1 | 12/2009 | Hamilton, II et al. |
| 2009/0327632 A1 | 12/2009 | Glaizel et al. |
| 2010/0030780 A1 | 2/2010 | Eshghi et al. |
| 2010/0070640 A1 | 3/2010 | Allen et al. |

(56) References Cited

U.S. PATENT DOCUMENTS

| | | |
|---|---|---|
| 2010/0077033 A1 | 3/2010 | Lowry |
| 2010/0088322 A1 | 4/2010 | Chowdhury et al. |
| 2010/0125604 A1 | 5/2010 | Martinez et al. |
| 2010/0131293 A1 | 5/2010 | Linthicum et al. |
| 2010/0131379 A1 | 5/2010 | Dorais et al. |
| 2010/0169137 A1 | 7/2010 | Jastrebski et al. |
| 2010/0169758 A1 | 7/2010 | Thomsen |
| 2010/0174692 A1 | 7/2010 | Meyer et al. |
| 2010/0179933 A1 | 7/2010 | Bai et al. |
| 2010/0191743 A1 | 7/2010 | Perronnin et al. |
| 2010/0191747 A1 | 7/2010 | Ji et al. |
| 2010/0241644 A1 | 9/2010 | Jackson et al. |
| 2010/0257198 A1 | 10/2010 | Cohen et al. |
| 2010/0268747 A1 | 10/2010 | Kern et al. |
| 2010/0274785 A1 | 10/2010 | Procopiuc et al. |
| 2011/0040724 A1 | 2/2011 | Dircz |
| 2011/0066649 A1 | 3/2011 | Berlyant et al. |
| 2011/0077048 A1 | 3/2011 | Busch |
| 2011/0078143 A1* | 3/2011 | Aggarwal ............ G06F 16/285 707/737 |
| 2011/0087678 A1 | 4/2011 | Frieden et al. |
| 2011/0093479 A1 | 4/2011 | Fuchs |
| 2011/0098056 A1 | 4/2011 | Rhoads et al. |
| 2011/0123087 A1 | 5/2011 | Nie et al. |
| 2011/0137882 A1 | 6/2011 | Weerasinghe |
| 2011/0161073 A1 | 6/2011 | Lesher et al. |
| 2011/0194744 A1 | 8/2011 | Wang et al. |
| 2011/0208688 A1 | 8/2011 | Ivanov et al. |
| 2011/0246483 A1 | 10/2011 | Darr et al. |
| 2011/0246498 A1 | 10/2011 | Forster |
| 2011/0252045 A1 | 10/2011 | Garg et al. |
| 2011/0282888 A1 | 11/2011 | Koperski et al. |
| 2011/0299427 A1 | 12/2011 | Chu et al. |
| 2011/0301967 A1 | 12/2011 | Friedlander et al. |
| 2011/0314155 A1 | 12/2011 | Narayanaswamy et al. |
| 2012/0004891 A1 | 1/2012 | Rameau et al. |
| 2012/0005239 A1 | 1/2012 | Nevin, III |
| 2012/0016715 A1 | 1/2012 | Brown et al. |
| 2012/0023141 A1 | 1/2012 | Holster |
| 2012/0072468 A1 | 3/2012 | Anthony et al. |
| 2012/0079493 A1 | 3/2012 | Friedlander et al. |
| 2012/0109640 A1 | 5/2012 | Anisimovich et al. |
| 2012/0110004 A1 | 5/2012 | Meijer |
| 2012/0110016 A1 | 5/2012 | Phillips |
| 2012/0131139 A1* | 5/2012 | Siripurapu ............ G06F 16/951 709/217 |
| 2012/0131468 A1 | 5/2012 | Friedlander et al. |
| 2012/0166373 A1* | 6/2012 | Sweeney ................ G06N 5/02 706/14 |
| 2012/0191704 A1 | 7/2012 | Jones |
| 2012/0209858 A1 | 8/2012 | Lambda et al. |
| 2012/0221439 A1 | 8/2012 | Sundaresan et al. |
| 2012/0233194 A1 | 9/2012 | Ohyu et al. |
| 2012/0239761 A1 | 9/2012 | Linner et al. |
| 2012/0240080 A1 | 9/2012 | O'Malley |
| 2012/0246148 A1 | 9/2012 | Dror |
| 2012/0259841 A1 | 10/2012 | Hsiao et al. |
| 2012/0278897 A1 | 11/2012 | Ang et al. |
| 2012/0281830 A1 | 11/2012 | Stewart et al. |
| 2012/0290950 A1 | 11/2012 | Rapaport et al. |
| 2012/0297278 A1 | 11/2012 | Gattani et al. |
| 2012/0311587 A1 | 12/2012 | Li et al. |
| 2012/0316821 A1 | 12/2012 | Levermore et al. |
| 2012/0330880 A1* | 12/2012 | Arasu ............ G06F 16/24544 706/52 |
| 2012/0330958 A1 | 12/2012 | Xu et al. |
| 2013/0019084 A1 | 1/2013 | Orchard et al. |
| 2013/0031302 A1 | 1/2013 | Byom et al. |
| 2013/0060696 A1 | 3/2013 | Martin et al. |
| 2013/0103389 A1* | 4/2013 | Gattani .................. G06F 17/28 704/9 |
| 2013/0124564 A1 | 5/2013 | Oztekin et al. |
| 2013/0173292 A1 | 7/2013 | Friedlander et al. |
| 2013/0173585 A1 | 7/2013 | Friedlander et al. |
| 2013/0191392 A1 | 7/2013 | Kumar et al. |
| 2013/0238667 A1 | 9/2013 | Carvalho et al. |
| 2013/0246562 A1 | 9/2013 | Chong et al. |
| 2013/0254202 A1 | 9/2013 | Friedlander et al. |
| 2013/0291098 A1 | 10/2013 | Chung et al. |
| 2013/0331473 A1 | 11/2013 | Safovich et al. |
| 2013/0326412 A1 | 12/2013 | Treiser |
| 2013/0339379 A1 | 12/2013 | Ferrari et al. |
| 2014/0006411 A1 | 1/2014 | Boldyrev et al. |
| 2014/0012884 A1 | 1/2014 | Bornea et al. |
| 2014/0025702 A1 | 1/2014 | Curtiss et al. |
| 2014/0074833 A1 | 3/2014 | Adams et al. |
| 2014/0074885 A1 | 3/2014 | Adams et al. |
| 2014/0074886 A1 | 3/2014 | Medelyan et al. |
| 2014/0074892 A1 | 3/2014 | Adams et al. |
| 2014/0081939 A1 | 3/2014 | Adams et al. |
| 2014/0098101 A1 | 4/2014 | Friedlander et al. |
| 2014/0172417 A1 | 6/2014 | Monk et al. |
| 2014/0188887 A1 | 7/2014 | Adams et al. |
| 2014/0214865 A1 | 7/2014 | Adams et al. |
| 2014/0214871 A1 | 7/2014 | Adams et al. |
| 2014/0250111 A1 | 9/2014 | Morton et al. |
| 2014/0344718 A1 | 11/2014 | Rapaport et al. |

FOREIGN PATENT DOCUMENTS

| | | |
|---|---|---|
| CN | 102236701 | 11/2011 |
| CN | 102385483 A | 3/2012 |
| EP | 1566752 A2 | 8/2005 |
| EP | 1843259 A2 | 10/2007 |
| WO | 2006086179 A2 | 8/2006 |
| WO | 2007044763 A2 | 4/2007 |

OTHER PUBLICATIONS

Evaggelio Pitoura et al., "Context in Databases", University of Ioannina, Greece, 2004, pp. 1-19.

Avinash Kaushik, "End of Dumb Tables in Web Analytics Tools! Hello: Weighted Sort", Sep. 7, 2010, www.kaushik.net, pp. 1-15.

Lorenzo Alberton, "Graphs in the Database: SQL Meets Social Networks," Techportal, Sep. 7, 2009, http://techportal.inviqa.com/2009/09/07/graphs-in-the-database-sql-meets-social-networks/, pp. 1-11.

Visual Paradigm, "DB Visual Architect 4.0 Designer's Guide: Chapter 6—Mapping Object Model to Data Model and Vice Versa", 2007, pp. 6-2-6-26.

Anonymous "Fraud Detection Using Data Analytics in the Banking Industry," ACL Services Ltd., 2010, pp. 1-9 <http://www.acl.com/pdfs/DP_Fraud_detection_BANKING.pdf>.

W. Caid et al., "Context Vector-Based Text Retrieval", Fair Isaac Corporation, Aug. 2003, pp. 1-20.

K. Matterhorn, "How to Share Data Between a Host Computer & Virtual Machine," Ehow, pp. 1-3, <http://www.ehow.com/how_7385388_share-host-computer-virtual-machine.html>, Retrieved Feb. 17, 2013.

U.S. Appl. No. 13/342,305, Friedlander et al.—Specification Filed Jan. 3, 2012.

Richard Saling, "How to Give a Great Presentation! From the HP Learning Center", Jul. 28, 2008, <http://rsaling.wordpress.com/2008/07/28/how-to-give-a-great-presentation/>, pp. 1-28.

A. Birrell et al., "A design for high-performance flash disks." ACM SIGOPS Operating Systems Review 41.2 (2007), pp. 88-93.

N. Saxena et al., "Data remanence effects on memory-based entropy collection for RFID systems", International Journal of Information Security 10.4 (2011), pp. 213-222.

A. Jin, et al., "Biohashing: Two Factor Authentication Featuring Fingerprint Data and Tokenised Random Number," Pattern Recognition 37, Elsevier Ltd., 2004, pp. 2245-2255.

M. Yu, et al., "Secure and Robust Error Correction for Physical Unclonable Functions", Verifying Physical Trustworthiness of ICS and Systems, IEEE Design & Test of Computers, IEEE, Jan./Feb. 2010, pp. 48-64.

P. Kanerva, "What We Mean When We Say "What's the Dollar of Mexico?": Prototypes and Mapping in Concept Space", Quantum

(56) References Cited

OTHER PUBLICATIONS

Informatics for Cognitive, Social, and Semantic Processes: Papers From the AAAI Fall Symposium, Association for the Advancement of Artificial Intelligence, 2010, pp. 2-6.
P. Kanerva, "Hyperdimensional Computing: an Introduction to Computing in Distributed Representation With High-Dimensional Random Vectors", Springer Science+Business Media, LLC, Cogn Comput, 1, 2009, pp. 139-159.
M.J. Flynn, et al., "Sparse Distributed Memory Principles of Operation", Research Institute for Advanced Computer Science, 1989, pp. 1-60.
U.S. Appl. No. 13/342,406—Non-Final Office Action dated Sep. 27, 2013.
U.S. Appl. No. 13/610,347—Non-Final Office Action dated Jul. 19, 2013.
U.S. Appl. No. 13/610,347—Notice of Allowance dated Aug. 19, 2013.
U.S. Appl. No. 13/592,905—Non-Final Office Action dated May 8, 2013.
J. Cheng et al., "Context-Aware Object Connection Discovery in Large Graphs", Data Engineering, 2009. ICDE '09. IEEE 25th International Conference on, pp. 856-867.
R. Angles et al., "Survey of Graph Database Models", ACM Computing Surveys, vol. 40, No. 1, Article 1, Feb. 2008, pp. 1-65.
U.S. Appl. No. 13/562,714, Robert R. Friedlander, et al.—Specification and Drawings Filed Jul. 31, 2012.
U.S. Appl. No. 13/648,801 Examiner's Answer dated Oct. 1, 2015.
U.S. Appl. No. 13/569,366—Non-Final Office Action dated Jun. 30, 2015.
U.S. Appl. No. 13/733,052—Non-Final Office Action dated Sep. 18, 2014.
U.S. Appl. No. 13/861,058—Non-Final Office Action dated Dec. 11, 2014.
U.S. Appl. No. 13/609,710—Final Office Action dated Jul. 24, 2014.
"Ninth New Collegiate Dictionary", Merriam-Webster Inc., 1991, p. 77 and 242.
"The American Heritage College Dictionary", Fourth Edition, Houghton Mifflin Company, 2004, p. 44 and 262.
U.S. Appl. No. 13/680,832—Non-Final Office Action dated Apr. 3, 2014.
U.S. Appl. No. 13/628,853—Notice of Allowance dated Mar. 4, 2014.
U.S. Appl. No. 13/540,267—Non-Final Office Action dated Feb. 4, 2014.
U.S. Appl. No. 13/540,230—Non-Final Office Action dated Jan. 30, 2014.
U.S. Appl. No. 13/540,295—Non-Final Office Action dated Jan. 30, 2014.
U.S. Appl. No. 13/609,710—Non-Final Office Action dated Jan. 27, 2014.
U.S. Appl. No. 13/342,406—Notice of Allowance dated Mar. 20, 2014.
U.S. Appl. No. 13/628,853—Non-Final Office Action dated Nov. 7, 2013.
U.S. Appl. No. 13/593,905—Notice of Allowance dated Oct. 25, 2013.
U.S. Appl. No. 13/595,356—Non-Final Office Action dated Apr. 14, 2014.
U.S. Appl. No. 13/755,623—Notice of Allowance dated May 27, 2014.
S. Alam et al., "Interoperability of Security-Enabled Internet of Things", Springer, Wireless Personal Communication, 2011, No. 61, pp. 567-586.
U.S. Appl. No. 13/648,801—Non-Final Office Action dated Jul. 1, 2014.
U.S. Appl. No. 13/896,461—Specification and Drawings Filed May 17, 2013.
U.S. Appl. No. 13/610,523 —Non-Final Office Action dated Apr. 30, 2015.
U.S. Appl. No. 13/540,267—Non-Final Office Action dated Jun. 4, 2015.
U.S. Appl. No. 13/609,710—Examiner's Answer dated Jun. 9, 2015.
U.S. Appl. No. 13/780,779—Non-Final Office Action dated Apr. 3, 2015.
U.S. Appl. No. 13/896,461—Non-Final Office Action dated Apr. 21, 2015.
U.S. Appl. No. 13/755,987—Non-Final Office Action dated Jan. 2, 2015.
G. Begelman et al., "Automated Tag Clustering: Improving Search and Exploration in the TagSpace", Collaborative Tagging Workshop, WWW2006, Edinburgh, Scotland, May 2006, pp. 1-29.
U.S. Appl. No. 13/621,931—Non-Final Office Action dated Jan. 28, 2015.
U.S. Appl. No. 13/732,567—Non-Final Office Action dated Jan. 30, 2015.
U.S. Appl. No. 14/078,135—Notice of Allowance dated Feb. 24, 2015.
U.S. Appl. No. 13/756,051—Notice of Allowance dated Feb. 27, 2015.
U.S. Appl. No. 13/732,567—Non-Final Office Action dated Mar. 26, 2015.
L. Du et al., "A Unified Object-Oriented Toolkit for Discrete Contextual Computer Vision", IEEE, IEEE Colloquium on Pattern Recognition, Feb. 1997, pp. 3/1-3/5. (Abstract Only).
S. Ceri et al., "Model-Driven Development of Context-Aware Web Applications", ACM, ACM Transactions on Internet Technology, 2007, (Abstract Only).
U.S. Appl. No. 13/648,801—Final Office Action dated Jan. 13, 2015.
U.S. Appl. No. 13/861,058—Non-Final Office Action dated Apr. 25, 2016.
Filippova, Katja and Keith B. Hall, "Improved Video Categorization From Text Metadata and User Comments". Proceedings of the 34th International SCM SIGIR Conference on Research and Development in Information Retrieval. ACM, 2011.
Graham Pryor, "Attitudes and Aspirations in a Diverse World: the Project Store Perspective on Scientific Repositories". Ukoln, University of Bath, Digital Curation Center. the International Journal of Digital Curation, Issue 1, vol. 2, 2007. Nov. 2006.
U.S. Appl. No. 13/896,506 Non-Final Office Action dated Oct. 26, 2015.
U.S. Appl. No. 13/609,710 Decision on Appeal dated Nov. 4 2016.
U.S. Appl. No. 13/733,066 Examiner's Answer dated Dec. 20, 2016.
U.S. Appl. No. 13/861,058 Final Office Action dated Dec. 29, 2016.
U.S. Appl. No. 13/648,801 Decision on Appeal dated Jan. 18, 2017.
U.S. Appl. No. 15/088,221 Non-Final Office Action dated May 11, 2018.
U.S. Appl. No. 15/088,221 Non-Final Office Action dated Aug. 26, 2016.

\* cited by examiner

GENERATION OF SYNTHETIC CONTEXT OBJECTS USING BOUNDED CONTEXT OBJECTS

BACKGROUND

The present disclosure relates to the field of computers, and specifically to the use of databases in computers. Still more particularly, the present disclosure relates to a context-based database.

A database is a collection of data. Examples of database types include relational databases, graph databases, network databases, and object-oriented databases. Each type of database presents data in a non-dynamic manner, in which the data is statically stored.

SUMMARY

In one embodiment of the present invention, a processor-implemented method, system, and/or computer program product generates and utilizes synthetic context-based objects. One or more processors define a context object, where the context object provides a context that identifies a specific subject-matter, from multiple subject-matters, of a non-contextual data object, and where the non-contextual data object ambiguously relates to one or more of the multiple subject-matters. The processor(s) associate the non-contextual data object with the context object to define a synthetic context-based object and the synthetic context-based object with at least one specific data store, where said at least one specific data store is a data repository of data that is relevant to a context of the synthetic context-based object, and where the specific subject-matter for said at least one specific data store in a data structure overlaps a subject-matter of another data store in the data structure. A request is received from a requester for data from said at least one specific data store that is associated with the synthetic context-based object, where said at least one specific data store is within a database of multiple data stores. Data is returned to the requester from said at least one specific data store that is associated with the synthetic context-based object.

DETAILED DESCRIPTION

Figure 1:
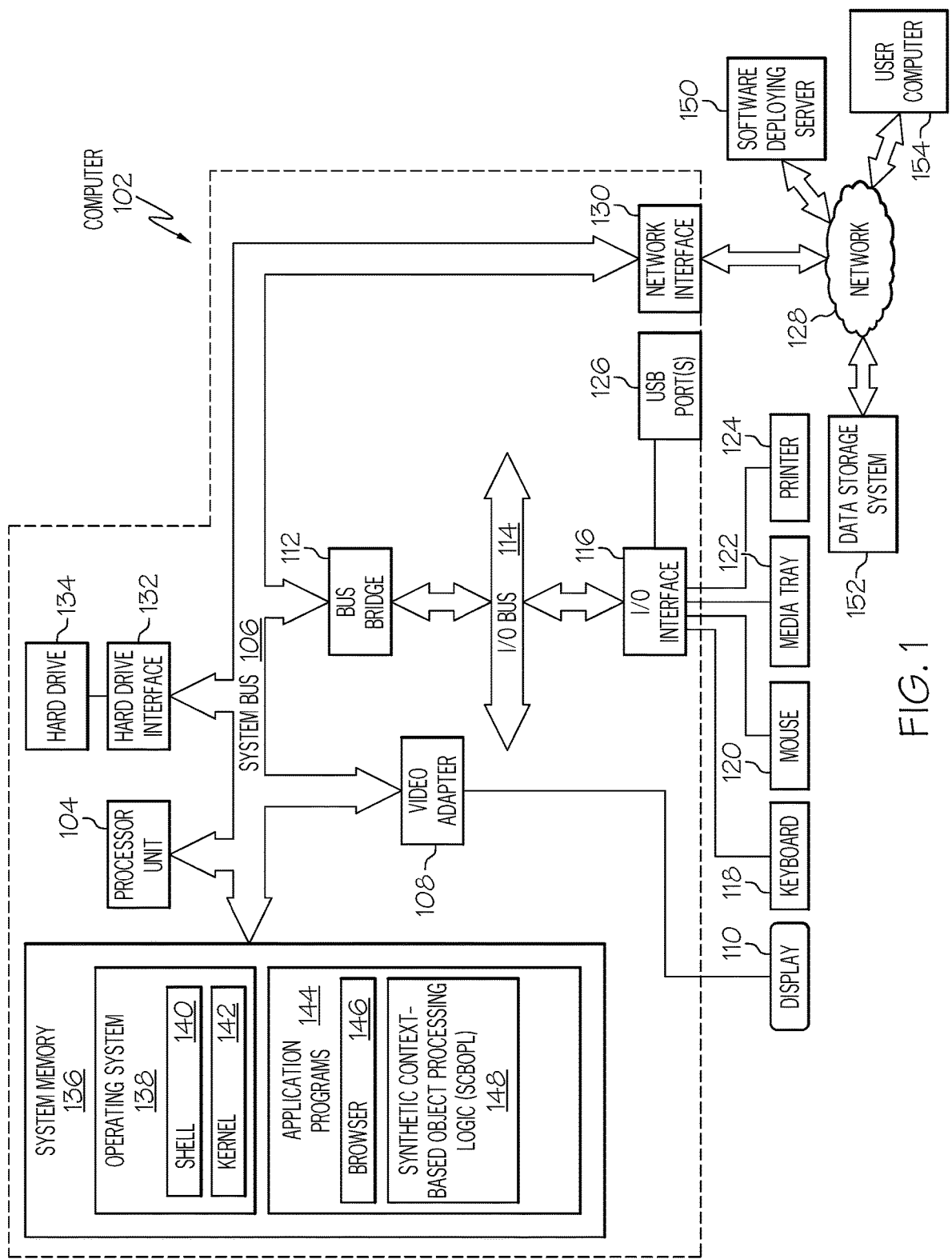
FIG. 1 depicts an exemplary system and network in which the present disclosure may be implemented.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including, but not limited to, wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

With reference now to the figures, and in particular to FIG. 1, there is depicted a block diagram of an exemplary system and network that may be utilized by and in the implementation of the present invention. Note that some or all of the exemplary architecture, including both depicted hardware and software, shown for and within computer 102 may be utilized by software deploying server 150, a data storage system 152, and/or a user computer 154.

Exemplary computer 102 includes a processor 104 that is coupled to a system bus 106. Processor 104 may utilize one or more processors, each of which has one or more processor cores. A video adapter 108, which drives/supports a display 110, is also coupled to system bus 106. System bus 106 is coupled via a bus bridge 112 to an input/output (I/O) bus 114. An I/O interface 116 is coupled to I/O bus 114. I/O interface 116 affords communication with various I/O devices, including a keyboard 118, a mouse 120, a media tray 122 (which may include storage devices such as CD-ROM drives, multi-media interfaces, etc.), a printer 124, and external USB port(s) 126. While the format of the ports connected to I/O interface 116 may be any known to those skilled in the art of computer architecture, in one embodiment some or all of these ports are universal serial bus (USB) ports.

As depicted, computer 102 is able to communicate with a software deploying server 150, using a network interface 130. Network interface 130 is a hardware network interface, such as a network interface card (NIC), etc. Network 128 may be an external network such as the Internet, or an internal network such as an Ethernet or a virtual private network (VPN).

A hard drive interface 132 is also coupled to system bus 106. Hard drive interface 132 interfaces with a hard drive 134. In one embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a world wide web (WWW) client (i.e., computer 102) to send and receive network messages to the Internet using hypertext transfer protocol (HTTP) messaging, thus enabling communication with software deploying server 150 and other computer systems.

Application programs 144 in computer 102's system memory (as well as software deploying server 150's system memory) also include a synthetic context-based object processing logic (SCBOPL) 148. SCBOPL 148 includes code for implementing the processes described below, including those described in FIGS. 2-8. In one embodiment, computer 102 is able to download SCBOPL 148 from software deploying server 150, including in an on-demand basis, wherein the code in SCBOPL 148 is not downloaded until needed for execution. Note further that, in one embodiment of the present invention, software deploying server 150 performs all of the functions associated with the present invention (including execution of SCBOPL 148), thus freeing computer 102 from having to use its own internal computing resources to execute SCBOPL 148.

The data storage system 152 stores an electronic data structure, which may be audio files, video files, website content, text files, etc. In one embodiment, computer 102 contains the synthetic context-based object database described herein, while data storage system 152 contains the non-contextual data object database, context object database, and data structure described herein. For example, in one embodiment, synthetic context-based object database 202 depicted in FIG. 2 is stored in a synthetic context-based object database storage system, which is part of the hard drive 134 and/or system memory 136 of computer 102 and/or data storage system 152; non-contextual data object database 206 depicted in FIG. 2 is stored in a non-contextual data object database storage system, which is part of the hard drive 134 and/or system memory 136 of computer 102 and/or data storage system 152; context object database 210 depicted in FIG. 2 is stored in a context object database storage system, which is part of the hard drive 134 and/or system memory 136 of computer 102 and/or data storage system 152; and data structure 302 depicted in FIG. 3 is stored in a data structure storage system, which is part of the hard drive 134 and/or system memory 136 of computer 102 and/or data storage system 152.

Note that the hardware elements depicted in computer 102 are not intended to be exhaustive, but rather are representative to highlight essential components required by the present invention. For instance, computer 102 may include alternate memory storage devices such as magnetic cassettes, digital versatile disks (DVDs), Bernoulli cartridges, and the like. These and other variations are intended to be within the spirit and scope of the present invention.

Note that SCBOPL 148 is able to generate and/or utilize some or all of the databases depicted in the context-based system in FIGS. 2-7.

Figure 2:
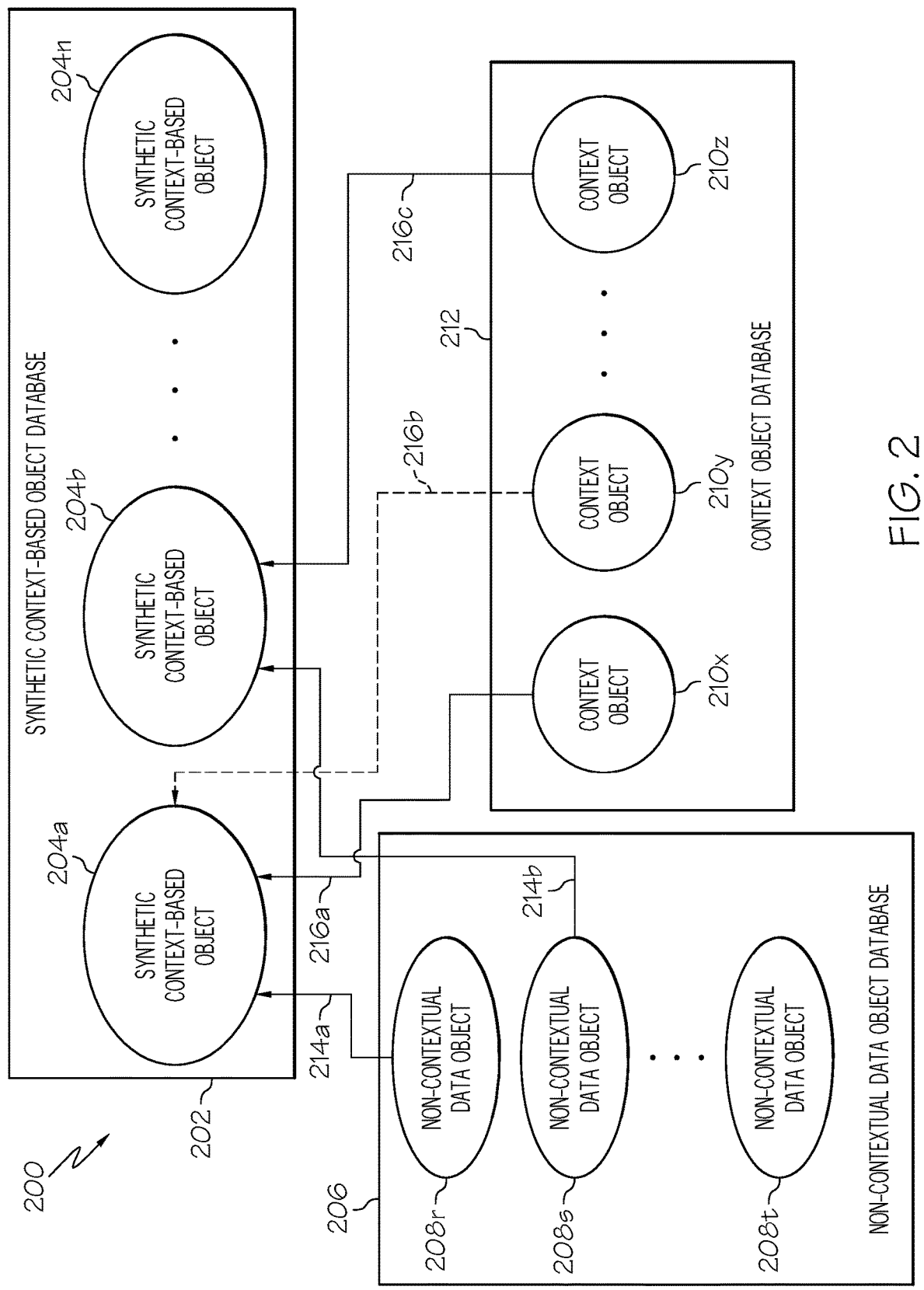
FIG. 2 illustrates a process for generating one or more synthetic context-based objects.
Figure 3:
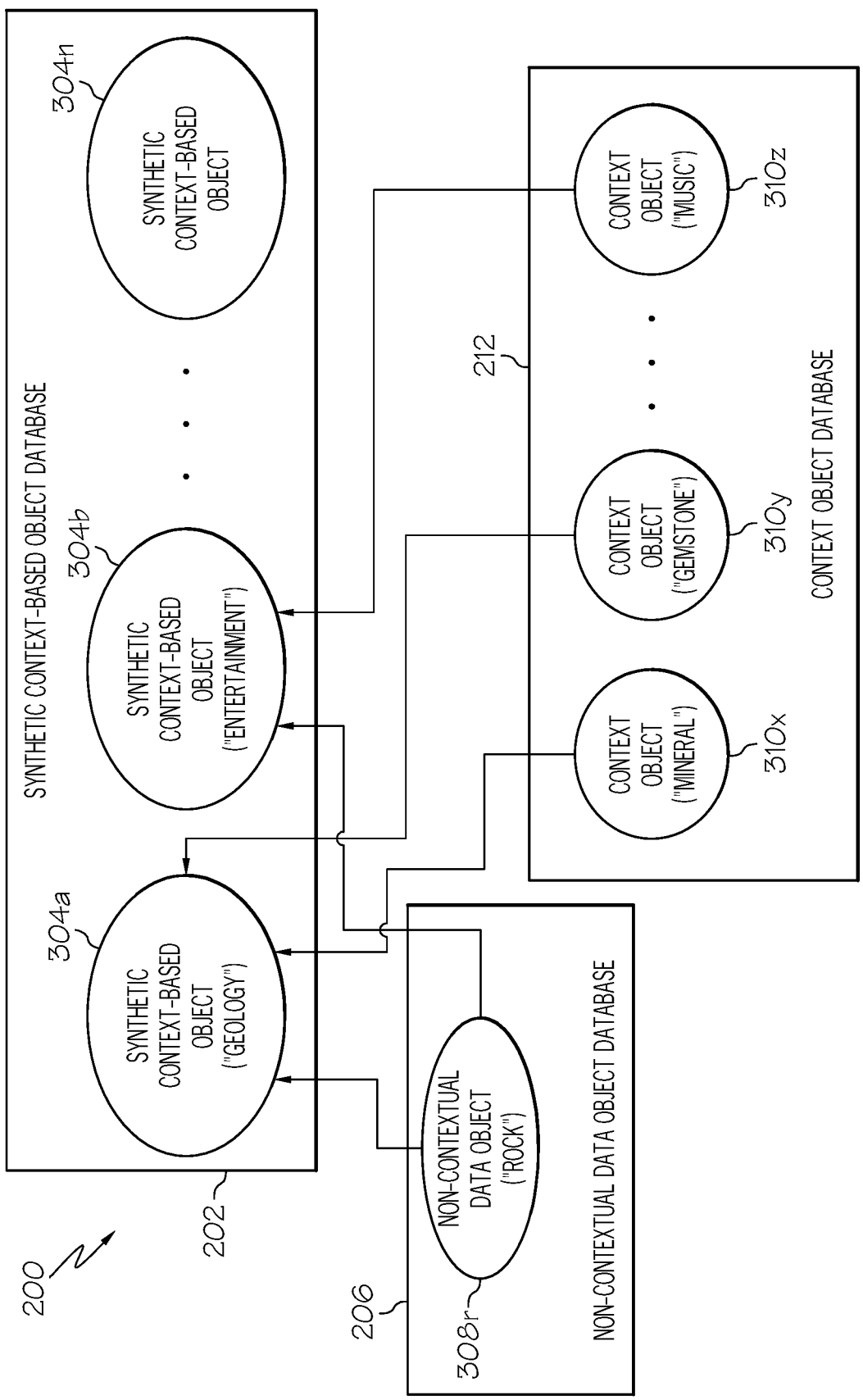
FIG. 3 depicts an exemplary case in which synthetic context-based objects are defined for the non-contextual data object datum "Rock"

With reference now to FIG. 2, a process for generating one or more synthetic context-based objects in a system 200 is presented. Note that system 200 is a processing and storage logic found in computer 102 and/or data storage system 152 shown in FIG. 1, which process, support, and/or contain the databases, pointers, and objects depicted in FIG. 2.

Within system 200 is a synthetic context-based object database 202, which contains multiple synthetic context-based objects 204a-204n (thus indicating an "n" quantity of objects, where "n" is an integer). Each of the synthetic context-based objects 204a-204n is defined by at least one non-contextual data object and at least one context object. That is, at least one non-contextual data object is associated with at least one context object to define one or more of the synthetic context-based objects 204a-204n. The non-contextual data object ambiguously relates to multiple subject-matters, and the context object provides a context that identifies a specific subject-matter, from the multiple subject-matters, of the non-contextual data object.

Note that the non-contextual data objects contain data that has no meaning in and of itself. That is, the data in the context objects are not merely attributes or descriptors of the data/objects described by the non-contextual data objects. Rather, the context objects provide additional information about the non-contextual data objects in order to give these non-contextual data objects meaning. Thus, the context objects do not merely describe something, but rather they define what something is. Without the context objects, the non-contextual data objects contain data that is meaningless; with the context objects, the non-contextual data objects become meaningful.

For example, assume that a non-contextual data object database 206 includes multiple non-contextual data objects 208r-208t (thus indicating a "t" quantity of objects, where "t" is an integer). However, data within each of these non-contextual data objects 208r-208t by itself is ambiguous, since it has no context. That is, the data within each of the non-contextual data objects 208r-208t is data that, standing alone, has no meaning, and thus is ambiguous with regards to its subject-matter. In order to give the data within each of the non-contextual data objects 208r-208t meaning, they are given context, which is provided by data contained within one or more of the context objects 210x-210z (thus indicating a "z" quantity of objects, where "z" is an integer) stored within a context object database 212. For example, if a pointer 214a points the non-contextual data object 208r to the synthetic context-based object 204a, while a pointer 216a points the context object 210x to the synthetic context-based object 204a, thus associating the non-contextual data object 208r and the context object 210x with the synthetic context-based object 204a (e.g., storing or otherwise associating the data within the non-contextual data object 208r and the context object 210x in the synthetic context-based object 204a), the data within the non-contextual data object 208r now has been given unambiguous meaning by the data within the context object 210x. This contextual meaning is thus stored within (or otherwise associated with) the synthetic context-based object 204a.

Similarly, if a pointer 214b associates data within the non-contextual data object 208s with the synthetic context-based object 204b, while the pointer 216c associates data within the context object 210z with the synthetic context-based object 204b, then the data within the non-contextual data object 208s is now given meaning by the data in the context object 210z. This contextual meaning is thus stored within (or otherwise associated with) the synthetic context-based object 204b.

Note that more than one context object can give meaning to a particular non-contextual data object. For example, both context object 210x and context object 210y can point to the synthetic context-based object 204a, thus providing compound context meaning to the non-contextual data object 208r shown in FIG. 2. This compound context meaning provides various layers of context to the data in the non-contextual data object 208r.

Note also that while the pointers 214a-214b and 216a-216c are logically shown pointing toward one or more of the synthetic context-based objects 204a-204n, in one embodiment the synthetic context-based objects 204a-204n actually point to the non-contextual data objects 208r-208t and the context objects 210x-210z. That is, in one embodiment the synthetic context-based objects 204a-204n locate the non-contextual data objects 208r-208t and the context objects 210x-210z through the use of the pointers 214a-214b and 216a-216c.

Consider now an exemplary case depicted in FIG. 3, in which synthetic context-based objects are defined for the non-contextual data object data "rock". Standing alone, without any context, the word "rock" is meaningless, since it is ambiguous and does not provide a reference to any particular subject-matter. That is, "rock" may refer to a stone, or it may be slang for a gemstone such as a diamond, or it may refer to a genre of music, or it may refer to physical oscillation, etc. Thus, each of these references are within the context of a different subject-matter (e.g., geology, entertainment, physics, etc.).

In the example shown in FIG. 3, then, data (i.e., the word "rock") from the non-contextual data object 308r is associated with (e.g., stored in or associated by a look-up table, etc.) a synthetic context-based object 304a, which is devoted to the subject-matter "geology". The data/word "rock" from non-contextual data object 308r is also associated with a synthetic context-based object 304b, which is devoted to the subject-matter "entertainment". In order to give contextual meaning to the word "rock" (i.e., define the term "rock") in the context of "geology", context object 310x, which contains the context datum "mineral", is associated with (e.g., stored in or associated by a look-up table, etc.) the synthetic context-based object 304a. In one embodiment, more than one context datum can be associated with a single synthetic context-based object. Thus, in the example shown in FIG. 3, the context object 310*y*, which contains the datum "gemstone", is also associated with the synthetic context-based object 304*a*.

Associated with the synthetic context-based object 304*b* is a context object 310*z*, which provides the context/datum of "pop music" to the term "rock" provided by the non-contextual data object 308*r*. Thus, the synthetic context-based object 304*a* defines "rock" as that which is related to the subject-matter "geology", including minerals and/or gemstones, while synthetic context-based object 304*b* defines "rock" as that which is related to the subject-matter "entertainment", including music.

In one embodiment, the data within a non-contextual data object is even more meaningless if it is merely a combination of numbers and/or letters. For example, consider the data "104-106" contained within a non-contextual data object 408*r* depicted in FIG. 4. Standing alone, without any context, these numbers are meaningless, identify no particular subject-matter, and thus are completely ambiguous. That is, "104-106" may relate to subject-matter such as a medical condition, a physics value, a person's age, a quantity of currency, a person's identification number, etc. That is, the data "104-106" is so vague/meaningless that the data does not even identify the units that the term describes, much less the context of these units.

Figure 4:
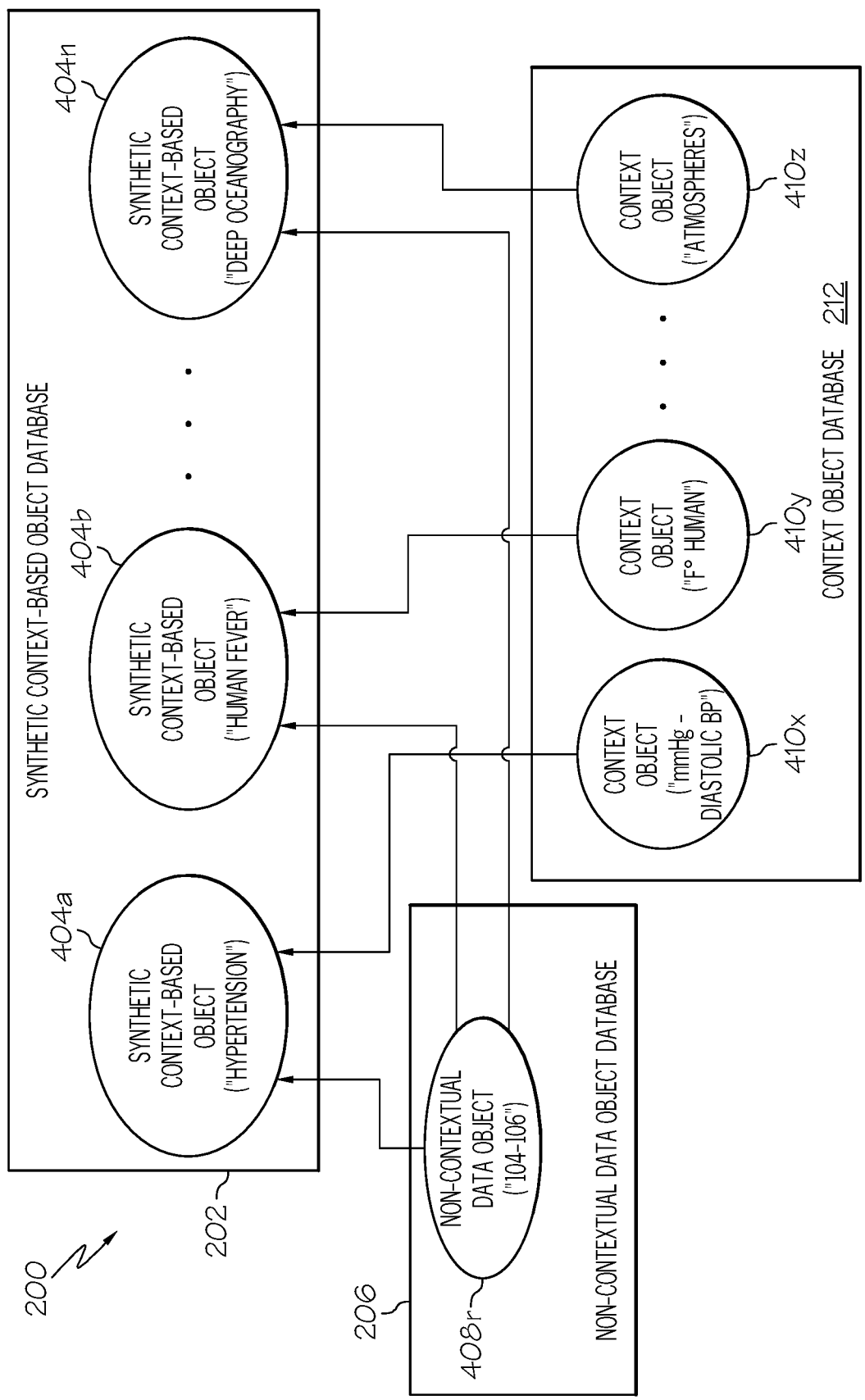
FIG. 4 illustrates an exemplary case in which synthetic context-based objects are defined for the non-contextual data object data "104-106"
Figure 5:
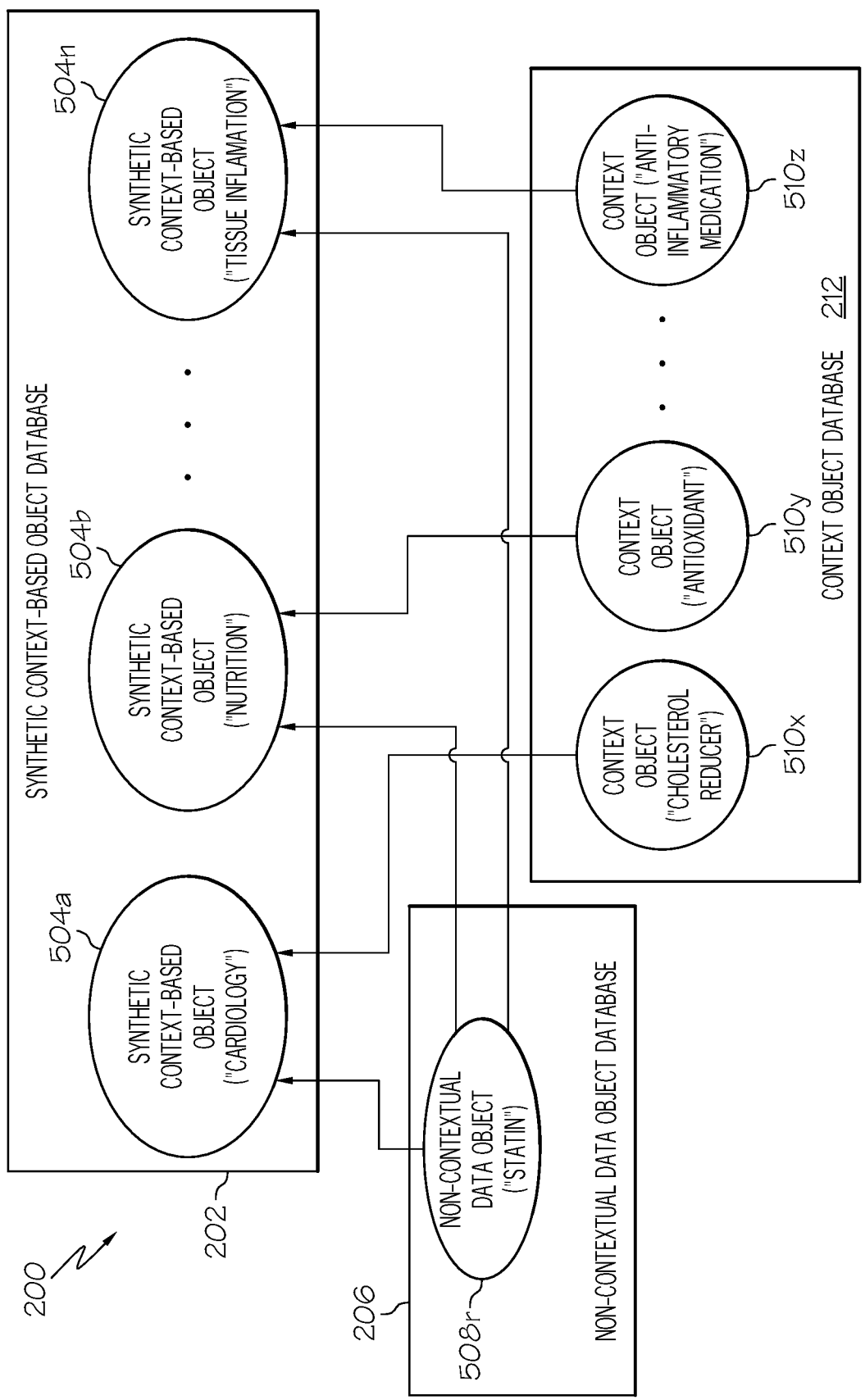
FIG. 5 depicts an exemplary case in which synthetic context-based objects are defined for the non-contextual data object datum "Statin"

In the example shown in FIG. 4, then, data (i.e., the term/values "104-106") from the non-contextual data object 408*r* is associated with (e.g., stored in or associated by a look-up table, etc.) a synthetic context-based object 404*a*, which is devoted to the subject-matter "hypertension". The term/values "104-106" from non-contextual data object 408*r* is also associated with a synthetic context-based object 404*b*, which is devoted to the subject-matter "human fever" and a synthetic context-based object 404*n*, which is devoted to the subject-matter "deep oceanography". In order to give contextual meaning to the term/values "104-106" (i.e., define the term/values "104-106") in the context of "hypertension", context object 410*x*, which contains the context data "millimeters of mercury" and "diastolic blood pressure"" is associated with (e.g., stored in or associated by a look-up table, etc.) the synthetic context-based object 404*a*. Thus, multiple context data can provide not only the scale/units (millimeters of mercury) context of the values "104-106", but the data can also provide the context data "diastolic blood pressure" needed to identify the subject-matter (hypertension) of the synthetic context-based object 404*a*.

Associated with the synthetic context-based object 404*b* is a context object 410*y*, which provides the context data of "degrees on the Fahrenheit scale" and "human" to the term/values "104-106" provided by the non-contextual data object 408*r*. Thus, the synthetic context-based object 404*b* now defines term/values "104-106" as that which is related to the subject matter of "human fever". Similarly, associated with the synthetic context-based object 404*n* is a context object 410*z*, which provides the context data of "atmospheres" to the term/values "104-106" provided by the non-contextual data object 408*r*. In this case, the generator of the synthetic context-based object database 202 determines that high numbers of atmospheres are used to define deep ocean pressures. Thus, the synthetic context-based object 404*n* now defines term/values "104-106" as that which is related to the subject matter of "deep oceanography".

In one embodiment, the non-contextual data object may provide enough self-context to identify what the datum is, but not what it means and/or is used for. For example, consider the datum "statin" contained within the non-contextual data object 508*r* shown in FIG. 5. In the example shown in FIG. 5, datum (i.e., the term "statin") from the non-contextual data object 508*r* is associated with (e.g., stored in or associated by a look-up table, etc.) a synthetic context-based object 504*a*, which is devoted to the subject-matter "cardiology". The term "statin" from non-contextual data object 508*r* is also associated with a synthetic context-based object 504*b*, which is devoted to the subject-matter "nutrition" and a synthetic context-based object 504*n*, which is devoted to the subject-matter "tissue inflammation". In order to give contextual meaning to the term "statin" (i.e., define the term "statin") in the context of "cardiology", context object 510*x*, which contains the context data "cholesterol reducer" is associated with (e.g., stored in or associated by a look-up table, etc.) the synthetic context-based object 504*a*. Thus, the datum "cholesterol reducer" from context object 510*x* provides the context to understand that "statin" is used in the context of the subject-matter "cardiology".

Associated with the synthetic context-based object 504*b* is a context object 510*y*, which provides the context/datum of "antioxidant" to the term "statin" provided by the non-contextual data object 508*r*. That is, a statin has properties both as a cholesterol reducer as well as an antioxidant. Thus, a statin can be considered in the context of reducing cholesterol (i.e., as described by the subject-matter of synthetic context-based object 504*a*), or it may considered in the context of being an antioxidant (i.e., as related to the subject-matter of synthetic context-based object 504*b*). Similarly, a statin can also be an anti-inflammatory medicine. Thus, associated with the synthetic context-based object 504*n* is the context object 510*z*, which provides the context data of "anti-inflammatory medication" to the term "statin" provided by the non-contextual data object 508*r*. This combination identifies the subject-matter of the synthetic context-based object 504*n* as "tissue inflammation".

Figure 6:
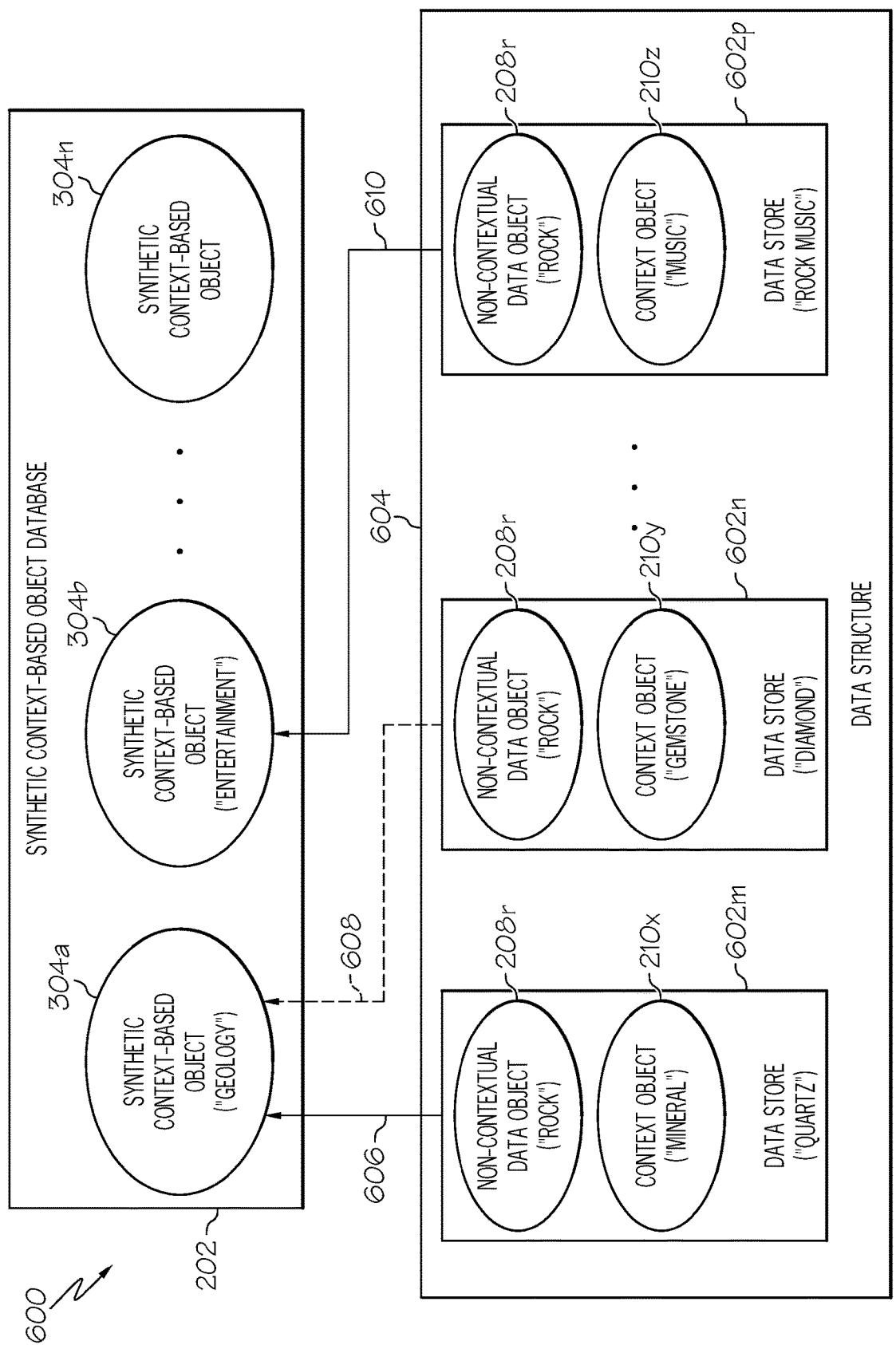
FIG. 6 illustrates a process for associating one or more data stores with specific synthetic context-based objects.

Once the synthetic context-based objects are defined, they can be linked to data stores. A data store is defined as a data repository of a set of integrated data, such as text files, video files, webpages, etc. With reference now to FIG. 6, a process for associating one or more data stores with specific synthetic context-based objects in a system 600 is presented. Note that system 600 is a processing and storage logic found in computer 102 and/or data storage system 152 shown in FIG. 1, which process, support, and/or contain the databases, pointers, and objects depicted in FIG. 6. The data structure 604 is a database of multiple data stores 602*m*-602*p* (thus indicating a "p" number of data stores, where "p" is an integer), which may be text documents, hierarchical files, tuples, object oriented database stores, spreadsheet cells, uniform resource locators (URLs), etc.

That is, in one embodiment, the data structure 604 is a database of text documents (represented by one or more of the data stores 602*m*-602*p*), such as journal articles, webpage articles, electronically-stored business/medical/operational notes, etc.

In one embodiment, the data structure 604 is a database of text, audio, video, multimedia, etc. files (represented by one or more of the data stores 602*m*-602*p*) that are stored in a hierarchical manner, such as in a tree diagram, a lightweight directory access protocol (LDAP) folder, etc.

In one embodiment, the data structure 604 is a relational database, which is a collection of data items organized through a set of formally described tables. A table is made up of one or more rows, known as "tuples". Each of the tuples (represented by one or more of the data stores 602*m*-602*p*) share common attributes, which in the table are described by column headings. Each tuple also includes a key, which may be a primary key or a foreign key. A primary key is an identifier (e.g., a letter, number, symbol, etc.) that is stored in a first data cell of a local tuple. A foreign key is typically identical to the primary key, except that it is stored in a first data cell of a remote tuple, thus allowing the local tuple to be logically linked to the foreign tuple.

In one embodiment, the data structure 604 is an object oriented database, which stores objects (represented by one or more of the data stores 602*m*-602*p*). As understood by those skilled in the art of computer software, an object contains both attributes, which are data (i.e., integers, strings, real numbers, references to another object, etc.), as well as methods, which are similar to procedures/functions, and which define the behavior of the object. Thus, the object oriented database contains both executable code and data.

In one embodiment, the data structure 604 is a spreadsheet, which is made up of rows and columns of cells (represented by one or more of the data stores 602*m*-602*p*). Each cell (represented by one or more of the data stores 602*m*-602*p*) contains numeric or text data, or a formula to calculate a value based on the content of one or more of the other cells in the spreadsheet.

In one embodiment, the data structure 604 is a collection of universal resource locators (URLs) for identifying a webpage, in which each URL (or a collection of URLs) is represented by one or more of the data stores 602*m*-602*p*.

These described types of data stores are exemplary, and are not to be construed as limiting what types of data stores are found within data structure 604.

Note that the data structure 604 is homogenous in one embodiment, while data structure 604 is heterogeneous in another embodiment. For example, assume in a first example that data structure 604 is a relational database, and all of the data stores 602*m*-602*p* are tuples. In this first example, data structure 604 is homogenous, since all of the data stores 602*m*-602*p* are of the same type. However, assume in a second example that data store 602*m* is a text document, data store 602*n* is an MM image, data store 602*p* is a tuple from a relational database, etc. In this second example, data structure 604 is a heterogeneous data structure, since it contains data stores that are of different formats.

FIG. 6 thus represents various data stores being "laid over" one or more of the synthetic context-based objects 304*a*-304*n* described above in FIG. 3. That is, one or more of the data stores 602*m*-602*p* is mapped to a particular synthetic context-based object from the synthetic context-based objects 304*a*-304*n*, in order to facilitate exploring/searching the data structure 604. For example, a pointer 606 (e.g., an identifier located within both synthetic context-based object 304*a* and data store 602*m*) points the data store 602*m* to the synthetic context-based object 304*a*, based on the fact that the data store 602*m* contains data found in the non-contextual data object 208*r* and the context object 210*x*, which together gave the subject-matter meaning to the synthetic context-based object 304*a* as described above. Similarly, pointer 608 points data store 602*n* to synthetic context-based object 304*a* as well, provided that synthetic context based object 304*a* also contains data from context object 210*y*, as described in an alternate embodiment above. Similarly, pointer 610 points data store 602*p* to synthetic context-based object 304*b*, since data store 602*p* and synthetic context-based object 304*b* both contain data from the non-contextual data object 208*r* as well as the context object 210*z*.

Figure 7:
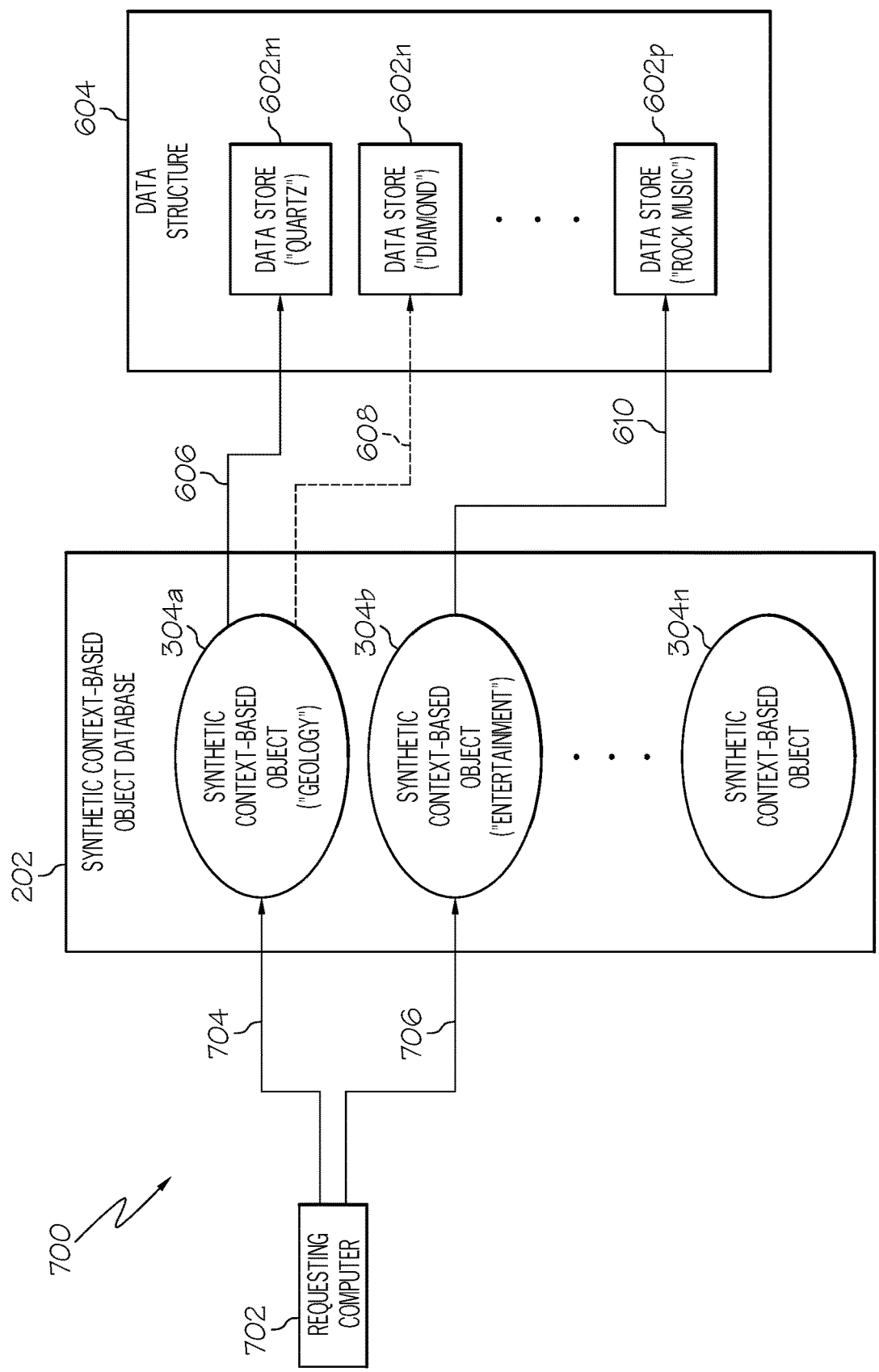
FIG. 7 depicts a process for locating a particular data store via a user-selected synthetic context-based object.

As described in FIG. 6, the pointers enable various data stores to be associated with subject-matter-specific synthetic context based objects. This association facilitates searching the data structure 604 according to the subject-matter, which is defined by the combination of data from the non-contextual data object and the context object, of a particular synthetic context-based object. Thus, as depicted in FIG. 7, an exemplary process for locating a particular data store via a particular synthetic context-based object is presented.

Assume that a user is using a computer such as requesting computer 702, which may be the user computer 154 shown in FIG. 1. The requesting computer 702 sends a request 704 to synthetic context-based object 304*a* if the user desires information about geological rocks (i.e., the subject-matter of geology). The user can specify this particular context-based object 304*a* by manually choosing it from a displayed selection of synthetic context-based objects, or logic (e.g., part of SCBOPL 148 shown in FIG. 1) can determine which synthetic context-based object and/or subject-matter are appropriate for a particular user, based on that user's interests, job description, job title, etc. The synthetic context-based object then uses pointer 606 to point to data store 602*m* and/or pointer 608 to point to data store 602*n*, and returns the data stored within these data stores to the requesting computer 702. Thus, the user/requesting system does not have to perform a search of all of the data structure 604, using data mining and associative logic, in order to find the data that the user desires. Rather, making an association between the user and a particular synthetic context-based object provides a rapid gateway from the requesting computer 702 to the desired data store.

Similarly, if the requester sends a request 706 to the synthetic context-based object 304*b*, then data from the data store 602*p* regarding rock music is retrieved and sent to the requester 702.

Note that the context objects described herein (e.g., context objects 210*x*-210*z* shown in FIG. 2) are defined/created based on constraints and/or hierarchical values in one embodiment. For example, consider the context object 310*z* from FIG. 3, which is presented in additional detail in FIG. 8. For example, assume that a base context object 802 provides the context of "music", which will ultimately provide part of the context for context object 310*z* ("Pop music") depicted in FIG. 3. However, additional sub-context objects are also available to further define the base context object 802. One example of such sub-context objects include sub-context objects 804*a*-804*c* (which define a particular decade from which the music was first performed/recorded/released). Another exemplary sub-context object is sub-context object 806, which provides the descriptor "operatic", which provides the context for a "rock opera" (rather than "grand opera", "light opera", etc.). Another exemplary sub-context object is sub-context object 808, which provides the descriptor "hip hop", which may be a sub-genre of rock music. Similarly, sub-context object 810 provides the descriptor "indie", indicating that the music is from an independent record label, rather than a major recording label (e.g., a recording company that has been predefined as a "major" recording company). Similarly, sub-context object 812 provides the descriptor "mash-up", indicating that the music is a combination of two types of music (e.g., spoken word and soft rock). Similarly, sub-context object 814 provides the descriptor "video", indicating that the file is a music video, rather than an audio-only recording.

Figure 8:
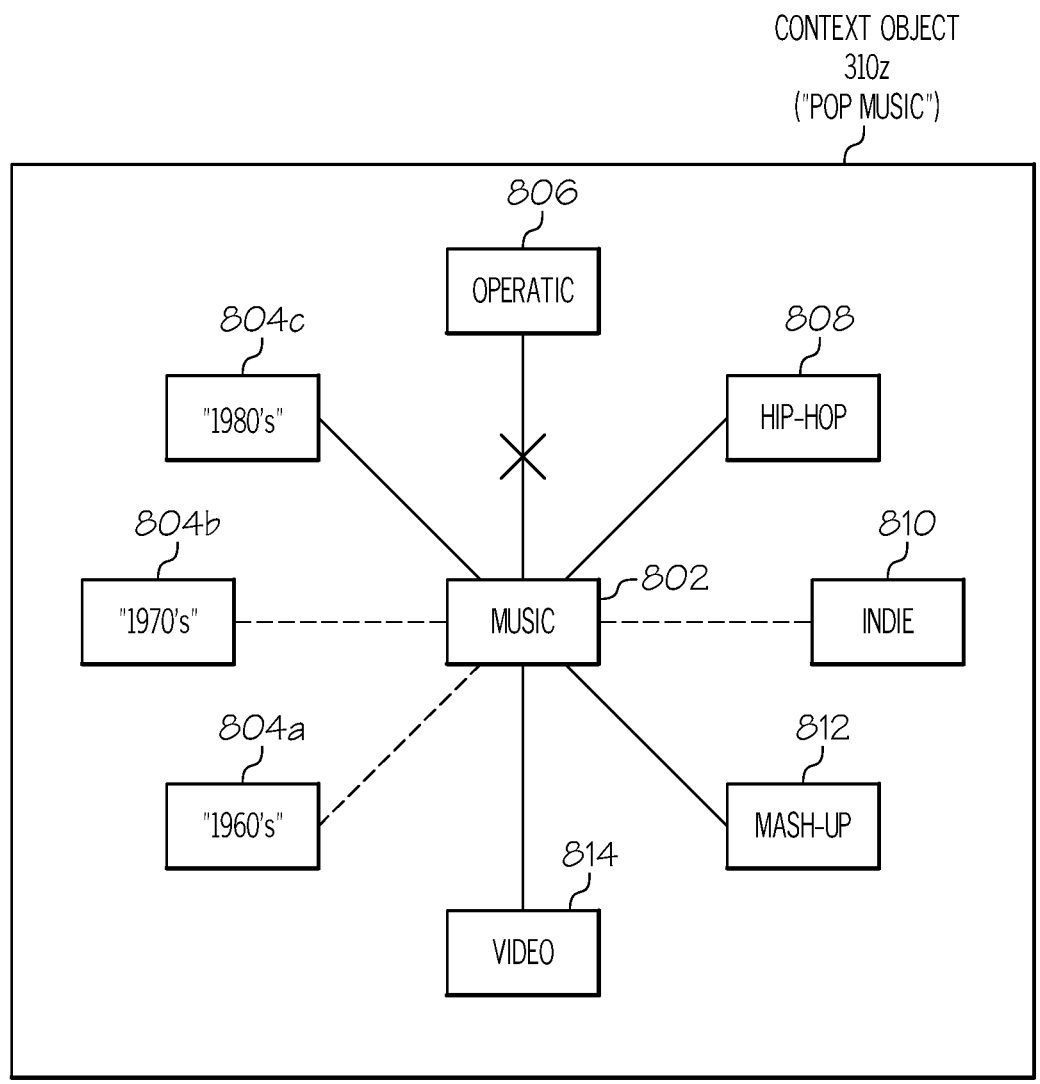
FIG. 8 illustrates an exemplary hierarchical constraint-bound context object.

As depicted in FIG. 8, the context object 310*z* is created using various sub-context objects that establish a scope and bound (i.e., contextual and bounded range) of the context object. That is, in the example shown, context object 310z describes a context of music that is from the 1980's, includes a mash-up with hip-hop, and is a music video. Note that sub-context objects 804a, 804b, and 810 may or may not be part of context object 310z in one embodiment (as indicated by the dashed lines). However, the context object 310z expressly excludes music files that are "rock operas", as indicated by the "X" blocking a connector from element 802 to element 806. Thus, when searching for related files (see FIG. 7), only those data stores that include the sub-context objects for a particular context object (as described in FIG. 8) will be retrieved.

While the context object can be defined according to certain sub-context objects, as depicted in FIG. 8, in one embodiment the context object selected is according to a hierarchical arrangement, which may be weighted. For example, consider the context objects 510x-510z depicted in FIG. 5. All of these are medical-based. In order to know which of the context objects is to be applied to the non-contextual data object 508r, a hierarchy can be established in one embodiment. For example, assume that context object 510x is predetermined to be a more likely/useful/common context for the non-contextual data object 508r than context objects 510y or 510z. In this example, context object 510x is applied to non-contextual data object 508r, while ignoring context objects 510y and 510z. Thus, only data files related to "cardiology" (according to the synthetic context-based object 504a) will be searched for and retrieved (as described in FIG. 7). In another embodiment, the predefined ranking of the context objects 510x-510z result in a sequential search pattern. For example, assume that context object 510x is ranked higher (and/or given a higher weighting) than context object 510y, and that context object 510y is ranked/weighted higher than context object 510z. In this example, data that matches synthetic context-based object 504a is searched/retrieved first, followed by searching for and retrieving data that matches synthetic context-based object 504b, followed by searching for and retrieving data that matches synthetic context-based object 504n.

Figure 9:
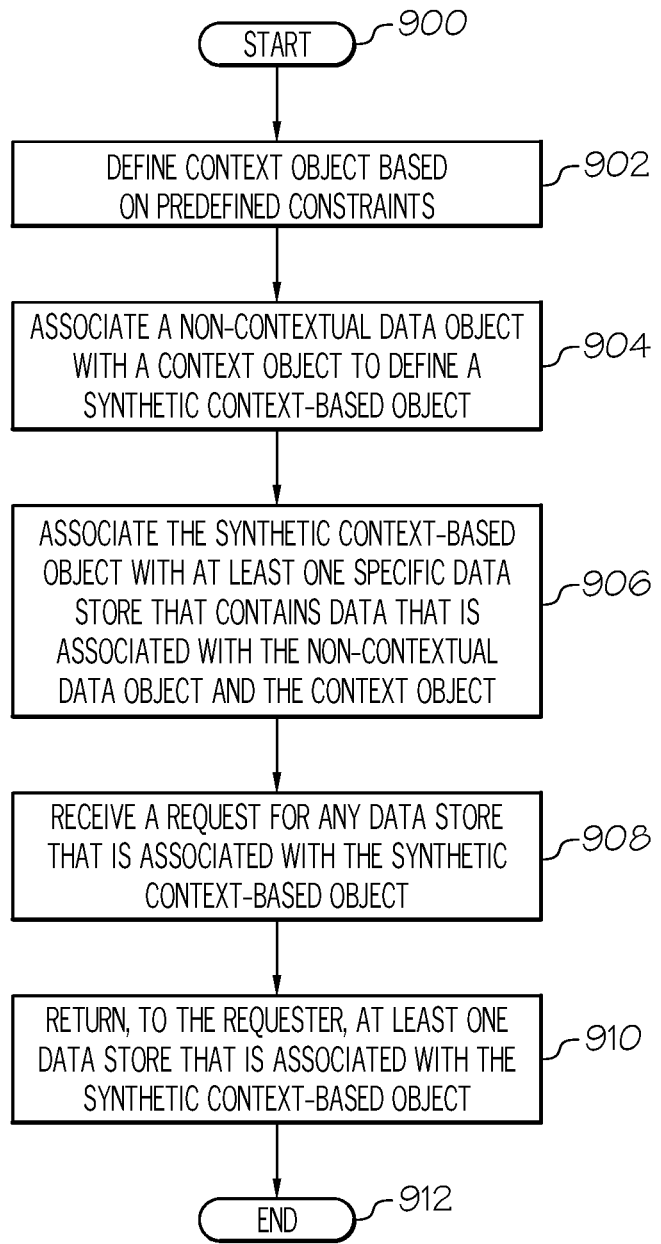
FIG. 9 is a high-level flow chart of one or more steps performed by a computer processor to generate and utilize synthetic context-based objects to locate and/or return specific data stores to a requester.

With reference now to FIG. 9, a high-level flow chart of one or more steps performed by a computer processor to generate and utilize synthetic context-based objects to locate and/or return specific data stores to a requester is presented. After initiator block 900, a context object is defined based on predefined constraints (block 902), as described in FIG. 8 and/or as described herein with reference to hierarchical constraints imposed on the exemplary context objects depicted in FIG. 5.

A non-contextual data object is then associated with the context object to define a synthetic context-based object (block 904). As described herein, the non-contextual data object ambiguously relates to multiple subject-matters. Standing alone, it is unclear to which of these multiple-subject matters the data in the non-contextual data object is directed. However, the context object provides a context that identifies a specific subject-matter, from the multiple subject-matters, of the non-contextual data object.

As described in block 906, the synthetic context-based object is associated with at least one specific data store. This at least one specific data store contains data that is associated with data contained in the non-contextual data object and the context object. That is, the data in the data store may be identical to that found in the non-contextual data object and the context object (i.e., the terms "rock" and "mineral" are in both the data store as well as the respective non-contextual data object and context object); it may be synonymous to that found in the non-contextual data object and the context object (i.e., the terms "rock" and "mineral" are the respective non-contextual data object and context object while synonyms "stone" and "element" are in the data store); and/or it may simply be deemed related by virtue of a lookup table that has been previously created (i.e., the term "rock" is mapped to the term "stone" and/or the term "mineral" is mapped to the term "elements" in a lookup table or similar associative data structure).

In one embodiment, the terms in the data stores are identified by data mining a data structure in order to locate the data from the non-contextual data object and the context object in one or more data stores. Thus, this data mining locates at least one specific data store that contains data contained in the non-contextual data object and the context object.

In one embodiment, the data store is a text document. In this embodiment, the data mining entails searching the text document for text data that is part of the synthetic context-based object, and then associating the text document that contains this text data with the synthetic context-based object.

In one embodiment, the data store is a video file. In this embodiment, the data mining entails searching metadata associated with the video file for text data that is part of the synthetic context-based object, and then associating the video file having this metadata with the synthetic context-based object.

In one embodiment, the data store is a web page. In this embodiment, the data mining entails searching the web page for text data that is part of the synthetic context-based object, and then associating the web page that contains this text data with the synthetic context-based object.

Note that in one embodiment, the specific subject-matter for a particular data store in the data structure is exclusive to only that particular data store. That is, only one data store is mapped to a particular synthetic context-based object, such that there is a one-to-one relationship between each synthetic context-based object and each data store. Note further that in another embodiment, the specific subject-matter for a particular data store in the data structure overlaps at least one other data store. That is, multiple data stores are mapped to a particular synthetic context-based object, such that there is a one-to-many relationship between a particular synthetic context-based object and multiple data stores.

With reference now to block 908, a request for any data store that is associated with the synthetic context-based object is then received (e.g., by computer 102 shown in FIG. 1). In one embodiment, this request is received from the requester via a request pointer, which points to a specific synthetic context-based object. In one embodiment, this specific synthetic context-based object is user-selected and/or user-specified (i.e., the user either manually chooses which synthetic context-based object is to be used, or this choice is made by processing logic based on characteristics of the requesting user).

As described in block 910, at least one data store that is associated with the synthetic context-based object is then returned to the requester. The process ends at terminator block 912.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

Note further that any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

What is claimed is:

1. A method for generating and utilizing synthetic context-based objects, the method comprising:
    defining, by one or more processors, a context object, wherein the context object comports with at least one constraint that defines a scope and bound of the context object, wherein the context object provides a context that identifies a specific subject-matter, from multiple subject-matters, of a non-contextual data object, and wherein the non-contextual data object ambiguously relates to one or more of the multiple subject-matters;
    associating, by one or more processors, the non-contextual data object with the context object to define a synthetic context-based object, wherein the synthetic context-based object points to the context object and the non-contextual data object;
    associating, by one or more processors, the synthetic context-based object with at least one specific data store, wherein said at least one specific data store is a data repository of data that is relevant to a context of the synthetic context-based object, and wherein the specific subject-matter for said at least one specific data store in a data structure overlaps a subject-matter of another data store in the data structure;
    receiving, from a requester, a request for data from said at least one specific data store that is associated with the synthetic context-based object, wherein said at least one specific data store is within a database of multiple data stores; and
    returning, to the requester, data from said at least one specific data store that is associated with the synthetic context-based object.

2. The method of claim 1, further comprising:
    data mining, by one or more processors, the data structure for the non-contextual data object and the context object, wherein said data mining locates said at least one specific data store that comprises data contained in both the non-contextual data object and the context object.

3. The method of claim 1, wherein the specific subject-matter for a particular data store in the data structure is exclusive to only said particular data store, and wherein said particular data store is mapped only to the synthetic context-based object such that there is a one-to-one relationship between the synthetic context-based object and said particular data store.

4. The method of claim 1, wherein said at least one specific data store is a text document, and wherein the method further comprises:
    searching, by one or more processors, the text document for text data that is part of the synthetic context-based object; and
    associating the text document that contains said text data with the synthetic context-based object.

5. The method of claim 1, wherein said at least one specific data store is a video file, and wherein the method further comprises:
    searching, by one or more processors, metadata associated with the video file for text data that is part of the synthetic context-based object; and
    associating the video file having said metadata with the synthetic context-based object.

6. The method of claim 1, wherein said at least one specific data store is a web page, and wherein the method further comprises:
    searching, by one or more processors, the web page for text data that is part of the synthetic context-based object; and
    associating the web page that contains said text data with the synthetic context-based object.

7. The method of claim 1, further comprising:
    receiving the request from the requester via a request pointer, wherein the request pointer points to a user-specified synthetic context-based object.

8. The method of claim 1, wherein said at least one specific data store is a set of objects that include object oriented programming (OOP) attributes and OOP methods, wherein the OOP attributes are from a group consisting of integers, strings, real numbers, and references to another object, etc., wherein the OOP methods are functions that define a behavior of an object, and wherein the method further comprises:

retrieving, by one or more processors, an object from said at least one specific data store that is relevant to the synthetic context-based object; and executing, by one or more processors, the retrieved object.

9. The method of claim 1, wherein said at least one specific data store is a relational database, wherein the relational database is a collection of data items organized through a set of formally described tables, wherein a table is composed of one or more rows, wherein each row from the one or more rows is a tuple that shares a common attribute, wherein a foreign key is stored in a first tuple in the relational database, wherein the foreign key is an identifier of a second tuple in the relational database, wherein the second tuple is said at least one specific data store, and wherein the method further comprises:

associating, by one or more processors, the foreign key with the synthetic context-based object and said at least one specific data store;

retrieving, by one or more processors, the foreign key from the first tuple; and using, by one or more processors, the foreign key to identify said second tuple in order to retrieve said at least one specific data store that is associated with the synthetic context-based object.

10. The method of claim 1, wherein the context object is from a plurality of context objects used to create synthetic context-based objects, and wherein the method further comprises:

applying, by one or more processors, a predefined ranking to each of the plurality of context objects used to create synthetic context-based objects; and searching, by one or more processors, the data repository for synthetic context-based objects in order of the predefined ranking of context objects used to create the synthetic context-based objects.

11. The method of claim 1, further comprising:

in response to receiving the request for data, returning, by one or more processors, the multiple data stores to the requester.

12. The method of claim 1, wherein the database of multiple data stores contains heterogeneous data structures, wherein the heterogeneous data structures include a text document, a medical image file, and a tuple from a relational database.

13. The method of claim 1, wherein said at least one specific data store is a collection of universal resource locators (URLs) that identify webpages.

14. A computer program product for generating and utilizing synthetic context-based objects, the computer program product comprising a non-transitory computer readable storage medium having program code embodied therewith, the program code readable and executable by a processor to perform a method comprising:

defining a context object, wherein the context object comports with at least one constraint that defines a scope and bound of the context object, wherein the context object provides a context that identifies a specific subject-matter, from multiple subject-matters, of a non-contextual data object, and wherein the non-contextual data object ambiguously relates to one or more of the multiple subject-matters;

associating the non-contextual data object with the context object to define a synthetic context-based object, wherein the synthetic context-based object points to the context object and the non-contextual data object;

associating the synthetic context-based object with at least one specific data store, wherein said at least one specific data store is a data repository of data that is relevant to a context of the synthetic context-based object, and wherein the specific subject-matter for said at least one specific data store in a data structure overlaps a subject-matter of another data store in the data structure;

receiving, from a requester, a request for data from said at least one specific data store that is associated with the synthetic context-based object, wherein said at least one specific data store is within a database of multiple data stores; and returning, to the requester, data from said at least one specific data store that is associated with the synthetic context-based object.

15. The method of claim 1, further comprising:

displaying, to the requester, multiple synthetic context-based objects;

receiving, from the requester, a selected synthetic context-based object from the multiple synthetic context-based objects; and returning, to the requester, data from said at least one specific data store that is associated with the selected synthetic context-based object.

16. The method of claim 1, further comprising:

storing, by one or more processors, the synthetic context-based object in a synthetic context-based object database;

storing, by one or more processors, the non-contextual data object in a non-contextual data object database; and storing, by one or more processors, the context object in a context object database, wherein the synthetic context-based object database, the non-contextual data object database, and the context object database are separate databases from one another.

17. The method of claim 1, further comprising:

associating, by one or more processors, a datum from the non-contextual data object with the synthetic context-based object by accessing a look-up table that matches the datum from the non-contextual data object with the synthetic context-based object;

associating, by one or more processors, a term from the context object with the synthetic context-based object by accessing a look-up table that matches the term from the context object with the synthetic context-based object; and returning, to the requester, the datum from the non-contextual data object and the term from the context object.

18. A computer system comprising:

one or more processors;

one or more computer readable memories; and one or more non-transitory computer readable storage mediums, wherein program instructions are stored on at least one of the one or more non-transitory computer readable storage mediums for execution by at least one of the one or more processors via at least one of the one or more computer readable memories to perform a method comprising:

defining a context object, wherein the context object comports with at least one constraint that defines a scope and bound of the context object, wherein the context object provides a context that identifies a specific subject-matter, from multiple subject-matters, of a non-contextual data object, and wherein the non-contextual data object ambiguously relates to one or more of the multiple subject-matters;

associating the non-contextual data object with the context object to define a synthetic context-based object, wherein the synthetic context-based object points to the context object and the non-contextual data object;

associating the synthetic context-based object with at least one specific data store, wherein said at least one specific data store is a data repository of data that is relevant to a context of the synthetic context-based object, and wherein the specific subject-matter for said at least one specific data store in a data structure overlaps a subject-matter of another data store in the data structure;

receiving, from a requester, a request for data from said at least one specific data store that is associated with the synthetic context-based object, wherein said at least one specific data store is within a database of multiple data stores; and returning, to the requester, data from said at least one specific data store that is associated with the synthetic context-based object.

19. The method of claim 1, wherein the context object provides a descriptor of the non-contextual data object, wherein the descriptor is not part of the non-contextual data object, and wherein the context object provides a context that identifies a specific subject-matter, from the multiple subject-matters, of the non-contextual data object.

20. The method of claim 1, further comprising:
mapping, by one or more processors, the synthetic context-based object to multiple data stores such that there is a one-to-many relationship between the synthetic context-based object and the multiple data stores.

* * * * *